Oct. 1, 1963    A. M. CVJETKOVIC ETAL    3,105,414
HIGH ENERGY IMPACTOR APPARATUS
Filed Dec. 26, 1961    3 Sheets-Sheet 1

INVENTORS
ANTUN CVJETKOVIC
MILTON CHANIN
BY
ATTORNEY

AGENT

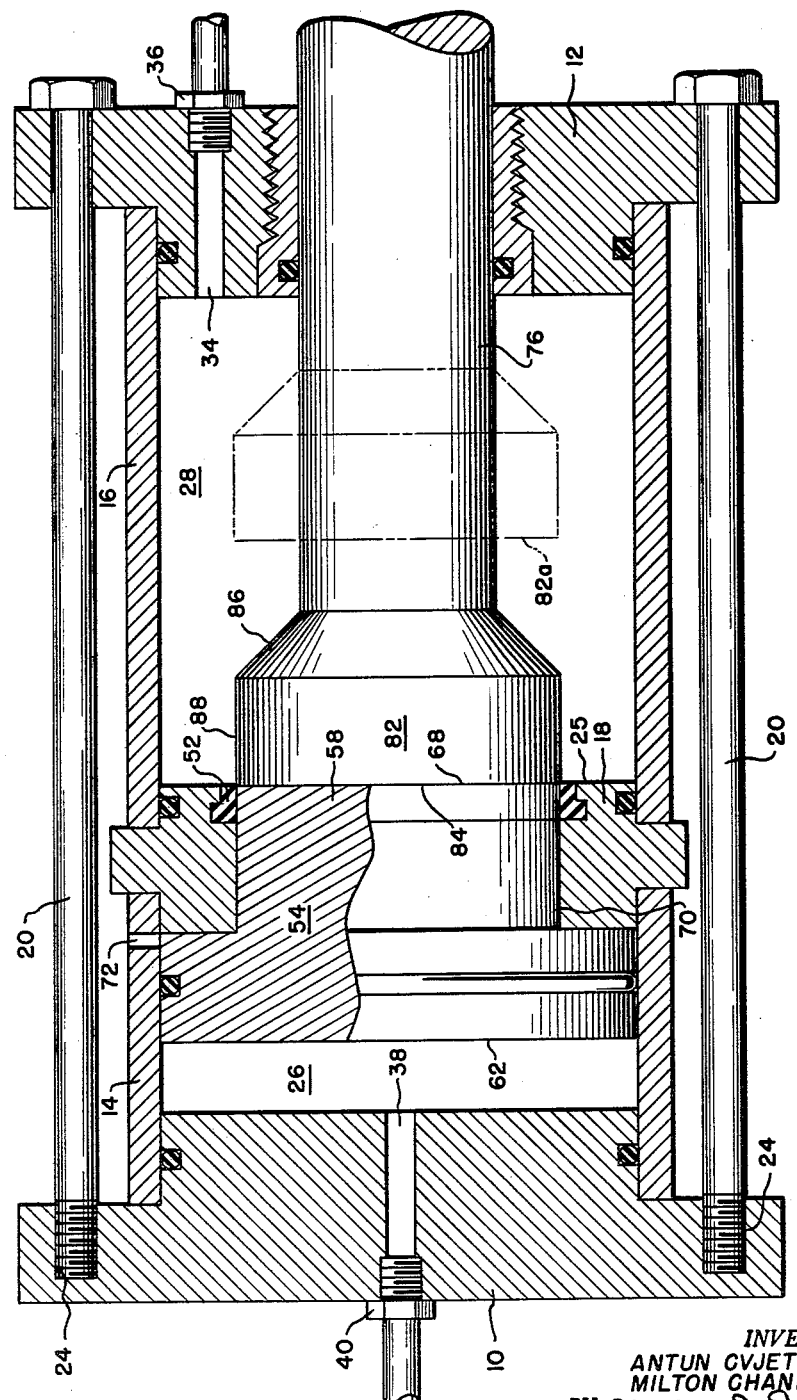

United States Patent Office 3,105,414
Patented Oct. 1, 1963

3,105,414
HIGH ENERGY IMPACTOR APPARATUS
Antun M. Cvjetkovic, Chula Vista, and Milton Chanin, La Mesa, Calif., assignors to General Dynamics Corporation, San Diego, Calif., a corporation of Delaware
Filed Dec. 26, 1961, Ser. No. 162,078
9 Claims. (Cl. 91—172)

The present invention is related to the inventions described and claimed in the copending applications of Boniard I. Brown, Serial No. 91,436, filed February 24, 1961, for "High Rate Actuators," which represents improvements upon inventions of certain earlier applications identified in the above copending application, and Josef K. Murek, Serial No. 129,120, filed August 3, 1961, for High Energy Actuator Apparatus, which represents improvements upon the above mentioned copending application, Serial No. 91,436.

The actuators of the above identified copending applications comprise generally a thrust member with a head portion which is cooperable with a wall or a resiliently supported seal base member to provide a pressure seal therebetween about an enclosed portion of the wall or seal base. An actuating pressure exerts a set force on an effective transverse area of the thrust member to urge the head portion toward the wall or seal base to effect the pressure seal. A triggering force is applied to the thrust member to overbalance the set force, thereby disengaging the pressure seal and releasing the actuating pressure upon an area of the head portion. The thrust member is thus impelled from the wall or seal base to produce useful output thrust. Preferably, the head portion has a surface confronting the wall or seal base, and the thrust column has an effective transverse area spaced axially from the head surface and facing substantially oppositely from the head surface. The pressure seal is preferably effected by a resilient sealing element positioned between the wall or seal base and the head portion. A triggering pressure, which may be the same as the actuating pressure, may be applied to an area of the head portion to exert the triggering force.

The devices of the copending applications are characterized by certain disadvantages. Useful output thrust is reduced and efficiency is affected by failure to provide means for sufficiently rapid release of the actuating pressure to the area of the head portion surface of the thrust member inside the annular resilient sealing element. The actuating pressure cannot pass by the seal with maximum rapidity because of the presence of triggering pressure within the sealing element at the instant the pressure seal is eliminated. Another disadvantage is that upon the reseating of the head portion surface for repeat operation, trapped pressure in the space defined by the wall member, the annular sealing element and the head portion surface area within the pressure seal must be relieved. Pressure such as the actuating pressure trapped in this space would act on the head portion area within the sealing element to oppose the set force exerted on the effective transverse area of the head portion back surface by the actuating pressure. A small triggering force or low triggering pressure would then effect movement of the thrust member from the wall. This would prevent effective triggering and cause premature slow movement of the thrust column, thereby preventing reliable repeat operation of the actuator. Still another disadvantage is that continued operation of the devices of the above copending applications repeatedly compresses the annular resilient sealing element which tends to rapidly wear out, thus increasing the likelihood of leakage of actuating pressure to the thrust column which in turn contributes to premature actuation of the actuator with lowered output efficiency. Also, worn sealing elements must be frequently replaced, thus increasing the down-time of the actuator.

The present invention provides an improved actuator which overcomes the disadvantages of the devices of the above identified applications. The actuator comprises generally a housing having a partition with an orifice to form a pair of pressure chambers. A resilient annular seal element is provided within the partition orifice. A floating piston and a thrust member with an actuator piston are each positioned within one of the pressure chambers for axial movement therein. The floating piston has a portion which is movable within the partition orifice. An external force is applied to the thrust member to move the actuator piston into the orifice to engage the resilient seal element to effect a first pressure seal about its outer surface and to urge the floating piston against an end wall member of the housing. An actuating pressure is established which acts upon a portion of the actuator piston to exert a set force urging the actuator piston and the floating piston toward the end wall member while the first pressure seal is maintained about the actuator piston. The external force is removed from the thrust member and a triggering force is applied to the floating piston to overbalance the set force, eliminating the first pressure seal about the actuator piston and effecting a second pressure seal about the outer surface of the reduced diameter portion. When the first pressure seal is eliminated the actuating pressure is suddenly released on the front surface of the actuator piston. The actuator piston and the thrust member are rapidly impelled from the floating piston to produce output thrust.

It is therefore an object of the present invention to provide a novel and improved high energy actuator.

An object of the invention is the provision of an improved actuator which generally achieves the objects of the previous inventions hereinbefore mentioned.

Another object of the present invention is to provide an improved actuator of simplified and economical construction.

It is an object of this invention to provide a novel high rate actuator which has improved efficiency and output thrust through very rapid release of actuating pressure to the actuator piston of a thrust column.

A further object of the present invention is the provision of a novel actuator capable of highly reliable operation.

Another object of this invention is to provide a novel high output actuator capable of providing high output efficiency and reliability of operation through the provision of improved pressure sealing prior to release of pressure to the actuator piston of a thrust member.

Other objects, features and advantages of the present invention will become apparent from a consideration of the following description, the appended claims and the accompanying drawings, wherein:

FIGURE 3 is a view similar to the views of FIGURES 1 and 2 showing operation of the actuator.

Figure 1:
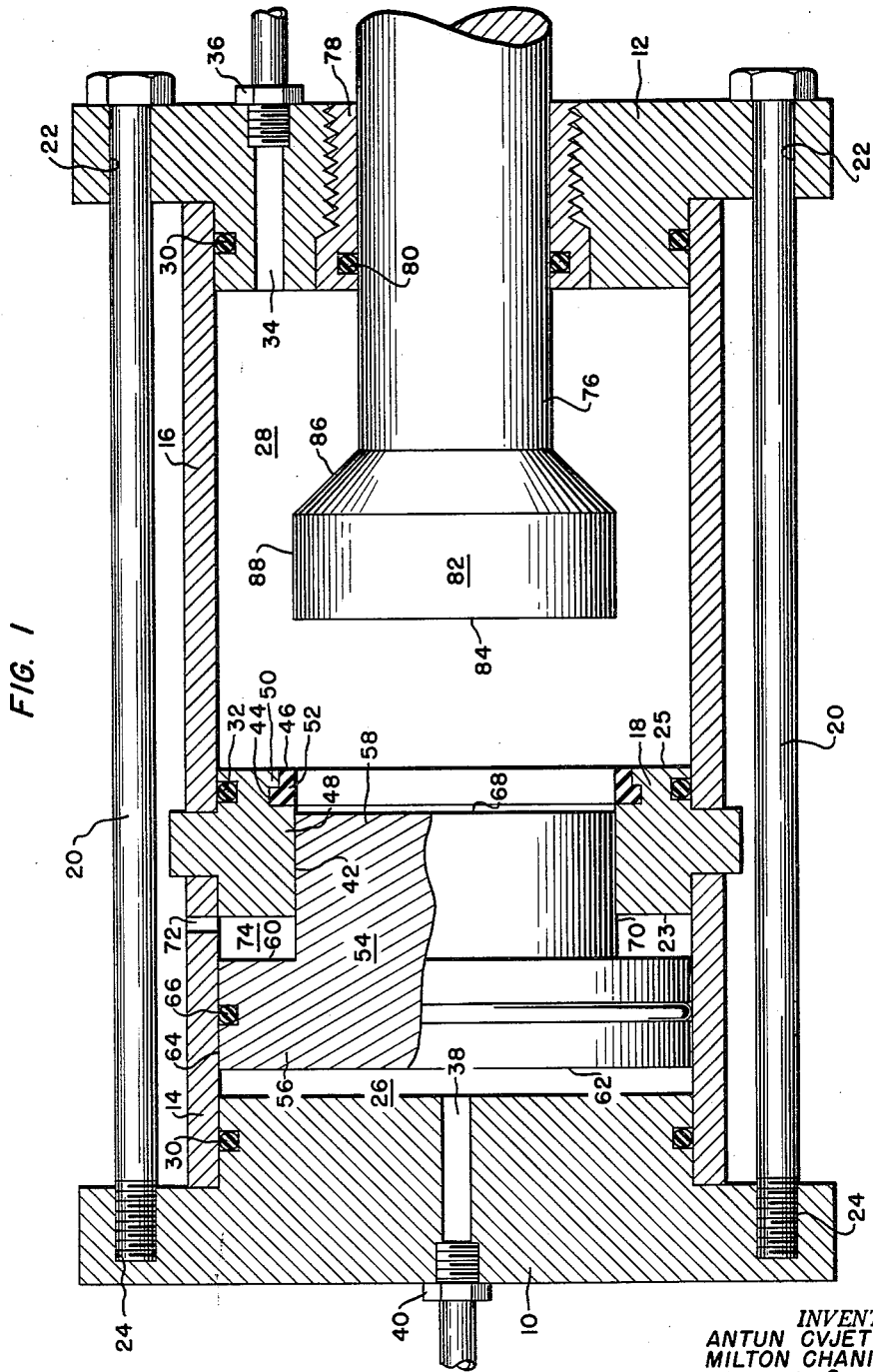
FIGURE 1 is an elevational view, partially in section, of the details of the actuator of the present invention prior to preparation for operation.

Referring to the drawings, and particularly to FIGURE 1, there is shown the actuator of the present invention. The actuator has a housing assembly consisting of end wall members 10 and 12, cylinders 14 and 16 forming the side wall of the assembly, and a plate or partition member 18, all secured in clamped relation by tie bolts 20. The tie bolts extend through appropriate openings 22 in a flanged portion of the end wall member 12 and are secured in threaded openings 24 in a flange portion of the end wall member 10. The plate member 18, which has an orifice, and surfaces 23 and 25, defines first and second generally cylindrical interconnected pressure chambers 26 and 28, and pressure sealing is provided by resilient seal rings 30 adjacent to respective end portions of cylinders 14 and 16 in appropriate annular grooves in the end wall members 10 and 12. Additional pressure sealing is provided by a resilient seal ring 32 positioned in an appropriate annular groove in the partition member 18 adjacent the other end of cylinder 16. A passage 34 in the end wall member 12 and a fluid coupling 36 interconnect the pressure chamber 28 with a source of actuating pressure (not shown). A passage 38 in the end wall member 10 and a fluid coupling 40 interconnect the chamber 26 with a source of triggering pressure (not shown).

The orifice of the partition 18 comprises a portion 42, and increased diameter portions 44 and 46 forming shoulders 48 and 50, which serve to accommodate an annular resilient seal element 52 therebetween, as shown. The seal element 52 is fashioned preferably from rubber, or the like, and is secured to the partition within the orifice, as by bonding, to provide pressure sealing as will hereinafter become more readily apparent.

A floating piston member 54 consisting of a portion 56, and a reduced diameter portion 58, is slidably positioned within chamber 26 for axial movement between the end wall member 10 and partition 18. The portion 56, has a front surface 60, a back surface 62, and an outer surface 64 provided with an annular resilient seal element 66 positioned in an appropriate peripheral groove to provide pressure sealing between the portion 56 and the cylinder 14 of the housing. The reduced diameter portion 58 has a front surface 68, and an outer surface 70, and is positioned within the orifice of partition member 18 for movement therein, and for engagement with seal element 52 to effect pressure sealing between its outer surface 70 and the partition member 18, as will be hereinafter more fully explained.

A port 72 through the cylinder 14, immediately adjacent the partition member 18, interconnects the exterior of the housing and the space 74 of chamber 26 between the portion 56 of the floating piston and the partition member 18, and serves to relieve pressure within the space 74, as will be hereinafter more readily apparent.

An output thrust member 76 is disposed for axial movement in chamber 28 and is slidably mounted in an annular bearing 78 which is threadedly secured in an opening in the end wall member 12. A sealing ring 80 in a bearing groove provides pressure sealing about the thrust member.

An actuator piston 82 is provided at the inner end of the thrust member in pressure chamber 28. The actuator piston has a front surface 84, a back surface 86, and an outer surface 88, and is adapted for movable positioning within the orifice of the partition 18 with its front surface 84 confronting the front surface 68 of the floating piston portion 58 and its outer surface 88 adapted for engagement with seal element 52 to effect pressure sealing thereabout.

Figure 2:
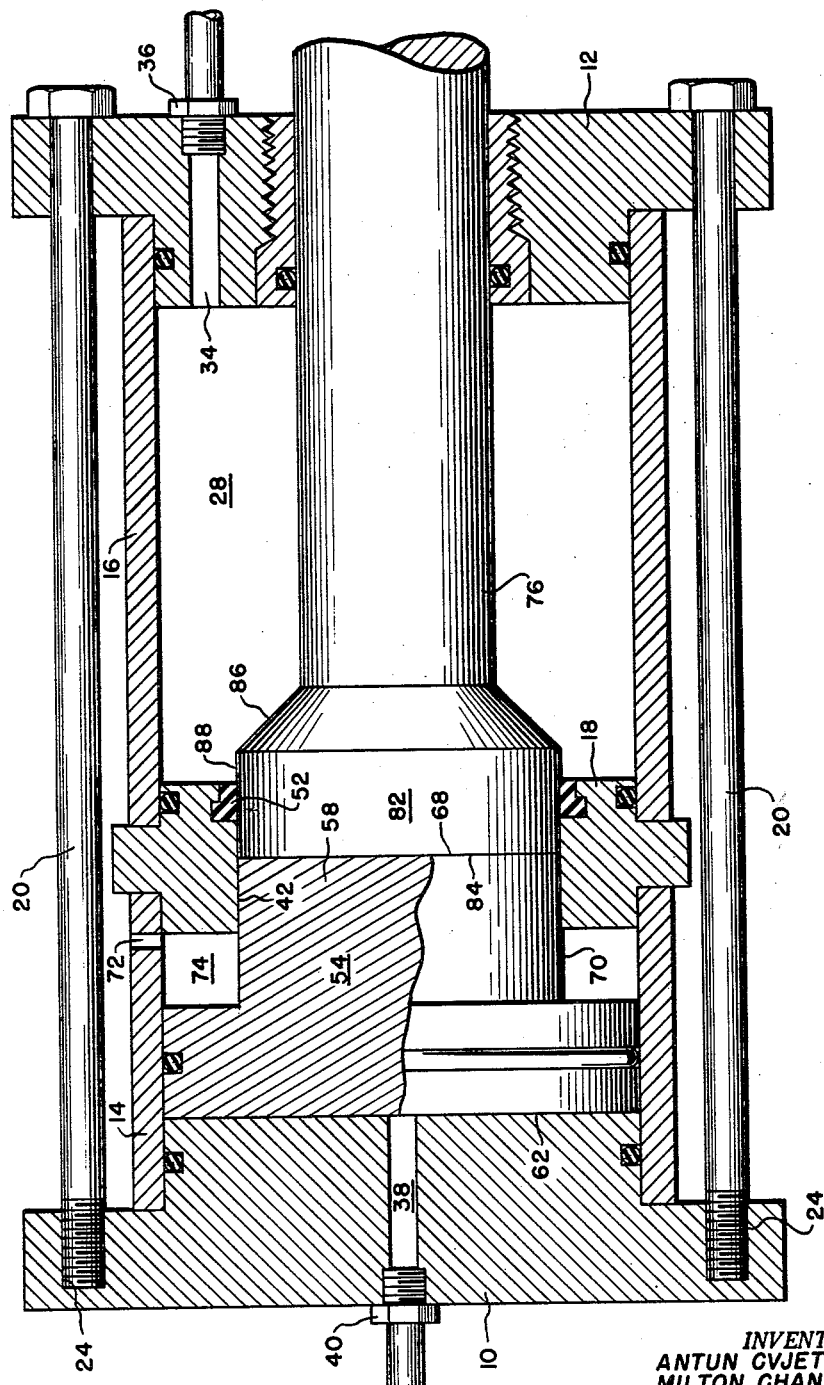
FIGURE 2 is a view similar to that of FIGURE 1, showing the actuator prepared for operation.

To prepare the actuator of FIGURE 1 for operation, external force by means (not shown) is first applied to the thrust member 76 to cause actuator piston 82 to enter the orifice of plate member 18 wherein a first pressure seal is effected by the seal element 52 between the outer surface 88 of the actuator piston and the plate member, as shown in FIGURE 2. Continued application of external force on the thrust member urges both the actuator piston 82 and the floating piston 54 to move toward the end wall member 10 until the back surface 62 of the floating piston abuts the end wall member 10. During this movement any trapped fluid, such as air, between the confronting surfaces 68 and 84 escapes through the orifice portion 42 between the outer surface 70 of the reduced diameter portion 58 of the floating piston and the partition member 18 into the space 74, and is relieved to the exterior of the housing by means of port 72. Also, during this movement any trapped fluid between the end wall member 10 and the floating piston 54 is relieved through passage 38 and coupling 40.

Next, a relatively high actuating fluid pressure, preferably a gas, such as nitrogen, or the like, is introduced into the actuating pressure chamber 28 through the coupling 36 and passage 34, and the external force applied to the thrust member is removed. The actuating pressure acts upon the effective transverse area of the back surface 86 of the actuator piston to thereby exert a set force which serves to urge the actuator piston 82 and the floating piston 54 toward the end wall member 10 while the first pressure seal, effected by the seal element 52, is maintained between the partition member 18 and the outer surface 88 of the actuator piston about the outer surface.

To operate the actuator, referring to FIGURE 3, the set force exerted by the actuating pressure urging the actuator piston 82 and the floating piston 54 toward the end wall member 10 is overbalanced by a triggering force in the form of a triggering fluid pressure applied in chamber 26 to act on the floating piston back surface 62. The triggering pressure is introduced through the coupling 40 and the passage 38, and preferably constitutes oil under pressure, or the like. The triggering pressure must be sufficient to overbalance the set force exerted by the actuating pressure on the back surface 86 of the actuator piston.

The overbalancing action of the triggering pressure moves the floating piston 54 and the actuator piston 82 such that the reduced diameter portion 58 of the floating piston smoothly enters the seal element 52 whereby a second fluid pressure seal is effected between the outer surface 70 of the reduced diameter portion and the partition member 18. Continued movement of the floating piston 54 and the actuator piston 82 by the triggering force results in the actuator piston being expelled from the orifice of the partition member 18 and an elimination takes place of the first pressure seal effected by the seal element 52 between the partition member 18 and the outer surface 88 of the actuator piston. The resilient seal 52 maintains positive pressure sealing up to the instant the actuator piston 82 moves out of the seal, whereupon the actuating pressure in chamber 82 is released substantially instantaneously upon the front surface 84 of the actuator piston. The actuator piston 82 and the thrust member 76 are suddenly impelled at high velocity away from the floating piston member 54, as shown by the dashed line position 82a of the actuator piston in FIGURE 3, to produce high energy rate output thrust.

As shown in FIGURE 3, at the instant sealing about the actuator piston surface 82 is eliminated, the reduced diameter portion 58 of the floating piston member 54 is in a fully inserted position within the orifice of the partition member 18 with its end surface 68 substantially flush with the surface 25 of the partition member, and sealing is maintained by the sealing element 52 between its outer surface 70 and the partition member.

During the overbalancing action of the triggering pressure, any back pressure which would normally be developed within space 74 to act on the floating piston 54 is effectively relieved through the port 72 to the exterior of the housing.

The thrust member 76 is adapted to impact a workpiece (not shown). Movement of the thrust member is thereby stopped, and no special structure is required to effect deceleration of the thrust member.

To prepare the actuator for repeat operation, and best referring to FIGURE 3, external force by means (not shown) is again applied to the thrust member 76 to cause the actuator piston surface 84 to abut the surface 68 of the reduced diameter portion 58. A continued application of external force to the thrust member and a relieving of the triggering fluid pressure in chamber 26 serves to cause the actuator piston 82 and the floating piston member 54 to move up against the end wall member 10. The abutting surfaces 68 and 84 move smoothly into the seal element 52 and the first pressure seal between the partition member 18 and the actuator piston outer surface 88 is again effected, while the second pressure seal about the outer surface 70 of the reduced diameter portion 58 is eliminated, as shown best in FIGURE 2. Once the first pressure seal is effected, the actuating fluid pressure in chamber 28 acts upon the back surface 86 of the actuator piston to thereby exert the set force which urges the actuator piston 82 and the floating piston 54 against the end wall member 10. The external force applied to the thrust member 76 is now relieved and the set force exerted by the actuating fluid pressure maintains the actuator piston 82 and the floating piston member 54 in set position.

As stated previously, any trapped fluid pressure between the surfaces 68 and 84, in this instance the actuating fluid pressure in chamber 28, is relieved to the exterior of the housing through space 74 and the port 72. It is to be realized that any actuating fluid pressure trapped between the surfaces 68 and 84, unless relieved, would act on the surface 84 of the actuator piston to oppose the set force exerted by the actuating fluid pressure on the back surface 86 of the actuator piston. This could prevent effective triggering, and cause movement of the actuator piston against the set force exerted by the actuating pressure, thereby actuating the actuator prematurely, which would effect reliability of repeat operation of the actuator.

To operate the actuator of the present invention in repeat operation, the triggering fluid pressure is simply introduced through the coupling 40 and passage 38 to overbalance the set force exerted by the actuating pressure in chamber 28 against the back surface 86 of the actuator to cause the seal element 52 to effect pressure sealing about the outer surface 70 of the reduced diameter portion 58 and to eliminate pressure sealing about the outer surface 88 of the actuator piston to allow sudden release of the actuating pressure on the surface 84 of the actuator piston, whereby the thrust member 76 is impelled at high velocity to deliver impact upon the workpiece, as hereinbefore described.

Although a specific embodiment of the present invention has been illustrated and described herein, it will be understood that the same is merely exemplary of a presently preferred embodiment capable of attaining the objects and advantages hereinbefore mentioned, and that the invention is not limited thereto; variations will be readily apparent to those versed in the art, and the invention is to be given its broadest interpretation within the terms of the appended claims.

What we claim is:

1. An actuator comprising means defining a wall, a plate member having an orifice disposed opposite said wall, a movable member positioned for movement between said wall and said plate member and having a portion within said orifice, a piston, means for providing pressure sealing between said plate member and said piston about said piston and between said plate member and said portion, said piston being adapted for positioning within said orifice to oppose said portion and to effect said pressure sealing about said piston, means for establishing an actuating pressure, means for applying said actuating pressure to said piston to exert a set force thereon urging said piston against said portion to move said movable member toward said wall while maintaining said pressure sealing about said piston, and means for applying a triggering force to said movable member to overbalance said set force and move said movable member to effect said pressure sealing about said portion and move said piston to eliminate said pressure sealing about said piston and expose an area of said piston to said actuating pressure, whereby said piston is rapidly impelled from said movable member to produce output thrust.

2. An actuator comprising a wall, a plate having an orifice positioned opposite said wall, a member positioned for movement between said wall and said plate and having a portion within said orifice, a piston, seal means carried by said plate within said orifice for providing a first pressure seal between said plate and said piston and a second pressure seal between said plate and said portion, said piston being adapted for slidable positioning within said orifice to oppose said portion and to effect said first pressure seal, means for establishing an actuating pressure, means for applying said actuating pressure to said piston to exert a set force thereon urging said piston against said portion to move said member toward said wall while maintaining said first pressure seal, and means for applying a triggering force to said member to overbalance said set force and move said member to effect said second pressure seal and move said piston to eliminate said first pressure seal and expose an area of said piston to said actuating pressure, whereby said piston is rapidly impelled from said member to produce output thrust.

3. An actuator comprising a wall, a plate positioned opposite said wall and having an orifice with an annular resilient element therein, a member positioned for movement between said wall and said plate and having a portion movable within said orifice, an axially movable piston adapted to be inserted within said orifice to oppose said portion and in engagement with said element to effect pressure sealing between said plate and said piston, means for establishing an actuating pressure, means for applying said actuating pressure to said piston to exert a set force thereon urging said piston against said portion to move said member toward said wall while maintaining said pressure sealing between said plate and said piston, and means for applying force to said member to overcome said set force and move said portion into engagement with said element to effect pressure sealing between said plate and said portion and move said piston past said element to expose an area of said piston to said actuating pressure, whereby said piston is rapidly impelled from said member to produce useful output.

4. An actuator comprising housing means having an end wall, a partition having an orifice within said housing means, a movable member positioned within said housing means for axial movement between said end wall and said partition, said movable member having a portion in sealed sliding engagement with said housing means and a reduced diameter portion movable within said orifice, means for relieving pressure within the space between said movable member and said partition, a thrust member having a piston positioned within said housing means for axial movement, means for providing first and second pressure seals within said orifice between said partition and said piston and between said partition and said reduced diameter portion, respectively, said piston being adapted to be inserted within said orifice to oppose said reduced diameter portion and to effect said first pressure seal, means for establishing an actuating pressure within said housing means, means for applying said actuating pressure to said piston to exert a set force thereon urging said piston toward said reduced diameter portion to move said movable member toward said end wall while maintaining said first pressure seal, and means for applying force to said movable member to overbalance said set force and move said movable member to effect said second pressure seal and move said piston to eliminate said first pressure seal and expose an area of said piston to said actuating pressure, whereby said piston is rapidly impelled from said movable member to produce output thrust.

5. An actuator comprising housing means having an end wall, a partition having an orifice within said housing means, a movable member positioned within said housing means for axial movement between said end wall and said partition, said movable member having a portion in sealed sliding engagement with said housing means and a reduced diameter portion movable within said orifice, fluid passage means interconnecting the exterior of said housing means and the space between said movable member and said partition, a thrust member having a piston positioned within said housing means for axial movement therein, means for providing first and second pressure seals within said orifice between said partition and said piston and between said partition said reduced diameter portion, respectively, said piston being adapted to be inserted within said orifice to oppose said reduced diameter portion and to effect said first pressure seal, means for establishing an actuating pressure within said housing means, means for applying said actuating pressure to said piston to exert a set force thereon urging said piston toward said reduced diameter portion to move said movable member toward said end wall while maintaining said first pressure seal, and means for applying pressure to said movable member to overbalance said set force and move said movable member to effect said second pressure seal and move said piston to eliminate said first pressure seal and expose a surface of said piston to said actuating pressure, whereby said piston is rapidly impelled from said movable member to produce output thrust.

6. An actuator comprising housing means having an end wall and a side wall, a partition having an orifice within said housing means, a movable member positioned within said housing means for axial movement between said end wall and said partition, said movable member having a portion in sealed sliding engagement with said side wall and a reduced diameter portion movable within said orifice, a port through said side wall interconnecting the exterior of said housing means with the space between said movable member and said partition, said port being positioned immediately adjacent said partition, a thrust member having a piston positioned within said housing means for axial movement therein, means for providing first and second pressure seals within said orifice between said partition and said piston and between said partition said reduced diameter portion, respectively, said piston being adapted to be inserted within said orifice to oppose said reduced diameter portion and to effect said first pressure seal, means for establishing an actuating pressure within said housing means, means for applying said actuating pressure to said piston to exert a set force thereon urging said piston toward said reduced diameter portion to move said movable member toward said end wall while maintaining said first pressure seal, and means for applying force to said portion in sealed sliding engagement with said side wall to overbalance said set force and move said movable member to effect said second pressure seal and move said piston to eliminate said first pressure seal and expose a surface of said piston to said actuating pressure, whereby said piston is rapidly impelled from said movable member to produce output thrust.

7. An actuator comprising housing means having a pair of end walls and a side wall, a partition having an orifice within said housing means to provide first and second pressure chambers, a floating piston positioned within said first pressure chamber for axial movement therein, said floating piston having a portion in sealed sliding engagement with said side wall and a portion with a surface movable within said orifice, means for relieving pressure within said first chamber between said floating piston and said partition, a thrust member having an actuator piston with a surface positioned for axial movement within said second pressure chamber, means for providing pressure sealing between said partition and said actuator piston about said actuator piston and between said partition and said movable portion of said floating piston within said orifice about said movable portion, said actuator piston being positionable within said orifice with its surface in opposition to said movable portion surface to effect said pressure sealing about said actuator piston, means for establishing actuating fluid pressure within said second pressure chamber, means for applying said actuating fluid pressure to said actuator piston to exert a set force thereon urging said actuator piston and said floating piston toward one of said end walls while maintaining said pressure sealing about said actuator piston, and means for applying fluid pressure in said first pressure chamber to overbalance said set force and move said floating piston to effect said pressure sealing about said movable portion and move said actuator piston to eliminate said pressure sealing about said actuator piston and expose said actuator piston surface to said actuating fluid pressure, whereby said actuator piston is rapidly impelled from said floating piston toward said other end wall to produce output thrust by said thrust member.

8. An actuator comprising housing means having a pair of end walls and a side wall, a partition having an orifice within said housing means to provide first and second pressure chambers, a floating piston positioned within said first pressure chamber for axial movement therein, said floating piston having a portion in sealed sliding engagement with said side wall and a portion with an end surface movable within said orifice, fluid passage means interconnecting the exterior of said housing means and said first pressure chamber between said floating piston and said partition, a thrust member having an actuator piston with an end surface positioned for axial movement within said second pressure chamber, seal means carried by said partition within said orifice for providing a first pressure seal between said partition and said actuator piston and a second pressure seal between said partition and said movable portion within said orifice, said actuator piston being adapted for slidable positioning within said orifice with its end surface confronting the end surface of said movable portion and to effect said first pressure seal, means for establishing actuating fluid pressure within said second pressure chamber, means for applying said actuating fluid pressure to said actuator piston to exert a set force thereon urging said actuator piston and said floating piston toward one of said end walls while maintaining said first pressure seal, and means for applying fluid pressure in said first pressure chamber to overbalance said set force and move said floating piston to effect said second pressure seal and move said actuator piston to eliminate said first pressure seal and expose said actuator piston end surface to said actuating fluid pressure, whereby said actuator piston is suddenly impelled from said movable portion surface toward said other end wall to produce output thrust by said thrust member.

9. An actuator comprising housing means having a pair of end walls and a side wall, a partition having an orifice within said housing means to provide first and second pressure chambers, an annular resilient element carried by said partition within said orifice, a floating piston positioned within said first pressure chamber for axial movement therein, said floating piston having a portion in sealed sliding engagement with said side wall and a movable portion with an outer surface and an end surface movable within said orifice, a port through said side wall interconnecting the exterior of said housing means and said first pressure chamber between said floating piston and said partition, said port being positioned immediately adjacent said partition, a thrust member having an actuator piston with an outer surface and an end surface positioned for axial movement within said second pressure chamber, said actuator piston being adapted for insertion within said orifice with its end surface confronting the end surface of said movable portion of said floating piston and its outer surface in engagement with said element to effect a first pressure seal between said partition and said actuator piston, means for establishing actuating fluid pressure within said second pressure chamber, means for applying said actuating fluid pressure to said actuator piston to exert a set force thereon urging said actuator piston and said floating piston toward one of said end walls while maintaining said first pressure seal, and means for applying fluid pressure in said first pressure chamber to overbalance said set force and move said floating piston to engage the outer surface of said movable portion with said element to effect a second pressure seal between said partition and said movable portion and move said actuator piston outer surface out of engagement with said element to eliminate said first pressure seal and expose said actuator piston end surface to said actuating fluid pressure, whereby said actuator piston and said thrust member are suddenly moved to produce output thrust by said thrust member.

References Cited in the file of this patent

UNITED STATES PATENTS 2,740,859     Beatty et al. -------------- Apr. 3, 1956